United States Patent
Hanzawa et al.

(10) Patent No.: US 7,104,685 B2
(45) Date of Patent: Sep. 12, 2006

(54) TEMPERATURE SENSOR WITH QUICK RESPONSE

(75) Inventors: Go Hanzawa, Aichi (JP); Masahiko Nishi, Aichi (JP); Masaki Iwaya, Gifu (JP); Takaaki Chosokabe, Ichinomiya (JP)

(73) Assignee: NGK Spark Plug Co., Ltd., Aichi (JP)

( * ) Notice: Subject to any disclaimer, the term of this patent is extended or adjusted under 35 U.S.C. 154(b) by 0 days.

(21) Appl. No.: 10/527,437

(22) PCT Filed: Mar. 25, 2004

(86) PCT No.: PCT/JP2004/004163

§ 371 (c)(1),
(2), (4) Date: Mar. 11, 2005

(87) PCT Pub. No.: WO2004/088261

PCT Pub. Date: Oct. 14, 2004

(65) Prior Publication Data

US 2005/0265426 A1    Dec. 1, 2005

(30) Foreign Application Priority Data

Mar. 28, 2003  (JP) .............................. 2003-089560
Mar. 19, 2004  (JP) .............................. 2004-079630

(51) Int. Cl.
*G01K 13/00*  (2006.01)
*G01K 1/00*  (2006.01)

(52) U.S. Cl. ........................ 374/208; 374/144; 374/148

(58) Field of Classification Search ........... 338/22 SD, 338/22 R, 28; 374/208, 144, 148

See application file for complete search history.

(56) References Cited

U.S. PATENT DOCUMENTS

| 3,913,058 A | 10/1975 | Nishio et al. |
| 4,560,973 A | 12/1985 | Grimm et al. |
| 6,130,598 A * | 10/2000 | Katsuki et al. ................ 338/28 |
| 6,264,363 B1 * | 7/2001 | Takahashi et al. ............ 338/28 |
| 6,501,366 B1 * | 12/2002 | Takahashi et al. ............ 338/28 |
| 6,639,505 B1 | 10/2003 | Murata et al. |
| 6,899,457 B1 * | 5/2005 | Kurano ........................ 338/28 |

FOREIGN PATENT DOCUMENTS

| JP | 62-1134 | 1/1987 |
| JP | 5-34543 | 5/1993 |
| JP | 2004-350241 A | 12/2002 |
| WO | WO 97/01746 | 1/1997 |

* cited by examiner

*Primary Examiner*—Yaritza Guadalupe-McCall
(74) *Attorney, Agent, or Firm*—Sughrue Mion, PLLC

(57) ABSTRACT

A temperature sensor (1) including a cylindrical metal tube (3) having a front end side blocked, a thermistor element (2), and a sheath member (8) connected to the thermistor element (2) and held in the inside of the metal tube (3), wherein: the metal tube (3) has a small-diameter portion (33) located on the front end side and entirely having an inner diameter smaller than the outer diameter of the sheath member (8), and a large-diameter portion (36) located on the rear end side of the small-diameter portion (33) and having a diameter larger than the outer diameter of the small-diameter portion (33); and a thermistor sintered body (21) is held in the small-diameter portion (33) and cement (10) is filled in between a front end of the thermistor sintered body (21) and a front end of an inner wall of the metal tube (3) and on the front end side viewed from a rear end surface of the thermistor sintered body (21).

12 Claims, 3 Drawing Sheets

TEMPERATURE SENSOR WITH QUICK RESPONSE

TECHNICAL FIELD

The present invention relates to a temperature sensor in which a thermal sensing element having a thermal sensing portion such as a thermistor sintered body of semiconductor such as metal oxide, etc. or a metal resistor is held in the inside of a metal tube shaped like a bottomed pipe. More particularly, it relates to a temperature sensor in which a thermal sensing element is disposed in a flow path of a measurement fluid (e.g. exhaust gas) such as the inside of a catalytic converter of an exhaust scrubber of a car or the inside of an exhaust pipe so that the temperature of the measurement fluid can be detected by the thermal sensing element.

BACKGROUND ART

There has been heretofore known a so-called exhaust gas temperature sensor using a thermistor element as a thermal sensing element for detecting the temperature of exhaust gas flowing in an exhaust gas flow path such as the inside of a catalytic converter of an exhaust scrubber of a car or the inside of an exhaust pipe. As this type temperature sensor, there is known a temperature sensor having a structure in which a thermistor element is disposed in the front end side inside of a metal tube shaped like a bottomed pipe while a sheath member having a sheath pipe in which metal cores connected to electrode wires of the thermistor element are held while electrically insulated is inserted into the metal tube (e.g. see Patent Documents 1 and 2). In such a temperature sensor, heat of the exhaust gas is received by the metal tube and then transmitted from the metal tube to the thermistor element to thereby detect the temperature.

[Patent Document 1]
Japanese Patent Laid-Open No. 2000-162051 (FIG. 1)
[Patent Document 2]
Japanese Patent Laid-Open No. 2002-350241 (FIG. 2)

DISCLOSURE OF THE INVENTION

Greater improvement of response characteristic (high response speed) is required of this type temperature sensor. In the temperature sensor described in Patent Document 1, a void is however present in between the metal tube and the thermistor element. Accordingly, transmission of heat from the metal tube to the thermistor element is disturbed by the void. For this reason, it is difficult to attain greater improvement of response characteristic in the temperature sensor having such a structure.

On the other hand, in the temperature sensor described in Patent Document 2, higher response characteristic than that of the temperature sensor described in Patent Document 1 can be expected because a side surface of the inner wall of the metal tube and a side surface of the thermistor element are in contact with each other through a glass layer. In the temperature sensor described in Patent Document 2, a void is however present in between a front end of the inner wall of the metal tube and a front end of the thermistor element. Accordingly, with respect to heat received from the front end side of the metal tube, transmission of heat from the metal tube to the thermistor element is also disturbed by the void in the same manner as in Patent Document 1. For this reason, also in the temperature sensor having such a structure, it is difficult to attain greater improvement of response characteristic.

Therefore, in consideration of the problem, an object of the present invention is to provide a temperature sensor which can achieve higher response characteristic.

As solution means, there is provided a temperature sensor including: a cylindrical metal tube extending in an axial direction and having a front end side blocked; a thermal sensing element held in the inside of the metal tube and having a thermal sensing portion with electrical characteristic varying according to the temperature, and a pair of electrode wires provided in the thermal sensing portion and extending toward a rear end side of the metal tube; and a sheath member held in the inside of the metal tube and having a sheath pipe in which a pair of metal cores connected to the pair of electrode wires of the thermal sensing element are held while electrically insulated, wherein: the metal tube has a small-diameter portion located on the front end side and entirely having an inner diameter smaller than the outer diameter of the sheath member, and a large-diameter portion located on the rear end side of the small-diameter portion and having a diameter larger than the outer diameter of the small-diameter portion; and the thermal sensing portion is held in the small-diameter portion and an electrically insulating member is filled at least in between a front end of the thermal sensing portion and a front end of an inner wall of the metal tube.

In the temperature sensor according to the invention, the electrically insulating member is filled in between the front end of the thermal sensing portion and the front end of the inner wall of the metal tube. In this manner, the electrically insulating member is filled in between the front end of the thermal sensing portion and the front end of the inner wall of the metal tube so that the front end of the thermal sensing portion and the front end of the inner wall of the metal tube are in contact with each other through the electrically insulating member. Accordingly, heat of exhaust gas or the like transmitted to the front end of the metal tube can be transmitted from the metal tube to the thermal sensing portion rapidly. Accordingly, a good response temperature sensor can be provided.

In the temperature sensor according to the invention, the metal tube has a small-diameter portion located on the front end side and entirely having an inner diameter smaller than the outer diameter of the sheath member, and a large-diameter portion located on the rear end side of the small-diameter portion and having a diameter larger than the outer diameter of the small-diameter portion, and the thermal sensing portion is held in the small-diameter portion. In this manner, the thermal sensing portion is held in the small-diameter portion of the metal tube. Accordingly, the distance between the thermal sensing portion and the metal tube can be shortened, so that heat can be transmitted from the metal tube to the thermal sensing portion rapidly. Moreover, because the small-diameter portion is provided in the metal tube, the heat capacity of this portion can be reduced so that response characteristic can be improved.

Preferably, in the aforementioned temperature sensor, the longest distance H between the front end of the thermal sensing portion and the front end of the inner wall of the metal tube is not larger than 2.0 mm.

Response characteristic can be improved when the thermal sensing portion is disposed in a possibly front end side of the metal tube. Therefore, in the temperature sensor according to the invention, the longest distance H between the front end of the thermal sensing portion and the front end of the inner wall of the metal tube is selected to be not larger than 2.0 mm. Because the longest distance H is selected to be not larger than 2.0 mm as described above, the distance between the front end of the thermal sensing portion and the front end of the inner wall of the metal tube can be shortened so that heat transmitted to the front end of the metal tube can be transmitted from the metal tube to the thermal sensing portion rapidly. Accordingly, a better response temperature sensor can be provided.

Preferably, in any one of the aforementioned temperature sensors, the shortest distance L between the thermal sensing portion and the metal tube satisfies 0≦L≦0.3 mm, and the outer diameter of the small-diameter portion is not larger than 3.5 mm.

Response characteristic can be improved when the distance between the thermal sensing portion and the metal tube is reduced as sufficiently as possible and the volume of the small-diameter portion is reduced. Therefore, in the temperature sensor according to the invention, the shortest distance L between the thermal sensing portion and the metal tube is selected to be in a range 0≦L≦0.3 mm, and the outer diameter of the small-diameter portion is selected to be not larger than 3.5 mm. Because the shortest distance L between the thermal sensing portion and the metal tube is selected to be in a range 0≦L≦0.3 mm as described above, the distance between the thermal sensing portion and the metal tube can be reduced so that heat transmitted to the metal tube can be transmitted from the metal tube to the thermal sensing portion rapidly. Because the outer diameter of the small-diameter portion is selected to be not larger than 3.5 mm, the heat capacity of the small-diameter portion in which the thermal sensing portion is held can be reduced. Accordingly, a better response temperature sensor can be provided.

Preferably, in any one of the aforementioned temperature sensors, the average filling rate of the electrically insulating member is not lower than 75%.

In the temperature sensor according to the invention, the average filling rate of the electrically insulating member is selected to be not lower than 75%. Accordingly, the structure of the electrically insulating member becomes so dense that heat conductivity of the electrically insulating member can be improved and that heat transmitted to the metal tube can be transmitted from the metal tube to the thermal sensing portion rapidly. Accordingly, a better response temperature sensor can be provided.

Preferably, in any one of the aforementioned temperature sensors, the heat conductivity of the electrically insulating member is not lower than 1.2 W/m·K.

In the temperature sensor according to the invention, the heat conductivity of the electrically insulating member is not lower than 1.2 W/m·K. Because the electrically insulating member having heat conductivity of not lower than 1.2 W/m·K is used as described above, the heat conducting characteristic of the electrically insulating member can be improved so that heat transmitted to the metal tube can be transmitted from the metal tube to the thermal sensing portion rapidly. Accordingly, a better response temperature sensor can be provided.

Preferably, in any one of the aforementioned temperature sensors, the electrically insulating member is a material containing alumina as a main component.

A material having excellent electrically insulating characteristic even at a high temperature and having excellent heat conducting characteristic is preferably used as the electrically insulating member filled in between the thermal sensing portion and the metal tube. Therefore, in the temperature sensor according to the invention, a material containing alumina as a main component is used as the electrically insulating member. Alumina is a material which is chemically stable at a high temperature and which has excellent electrically insulating characteristic at a high temperature and has excellent heat conducting characteristic. Accordingly, when alumina is used as the electrically insulating member, a temperature sensor excellent in durability and response characteristic can be provided.

Preferably, in any one of the aforementioned temperature sensors, the electrically insulating member is filled at least in the whole of a space ranging from the front end of the metal tube to a rear end of the thermal sensing portion.

In the temperature sensor according to the invention, the electrically insulating member is filled in the whole space ranging from the front end of the metal tube to the rear end of the thermal sensing portion. Because the electrically insulating member is filled without any gap in between the thermal sensing portion and the metal tube as described above, heat transmitted to the front end of the metal tube or the side surface of the small-diameter portion can be transmitted from the metal tube to the thermal sensing portion rapidly. Accordingly, a better response temperature sensor can be provided.

Preferably, in any one of the aforementioned temperature sensors, the electrically insulating member is filled at least in the whole of the small-diameter portion.

In the temperature sensor according to the invention, the electrically insulating member is filled in the whole of the small-diameter portion of the metal tube. Because the electrically insulating member is filled without any gap in between the thermal sensing portion and the metal tube as described above, heat transmitted to the front end of the metal tube or the side surface of the small-diameter portion can be transmitted from the metal tube to the thermal sensing portion rapidly. Accordingly, a better response temperature sensor can be provided.

Preferably, in any one of the aforementioned temperature sensors, a rear end of the electrically insulating member is located on a front end side viewed from the front end of the sheath pipe.

In the temperature sensor according to the invention, the rear end of the electrically insulating member is located on a front end side viewed from the front end of the sheath pipe, so that a void is formed between the electrically insulating member and the sheath pipe. For this reason, the electrically insulating member and the sheath pipe can be thermally insulated from each other, so that heat of exhaust gas or the like can be restrained from being transmitted (radiated) from the metal tube to the base end side of the temperature sensor through the electrically insulating member and the sheath pipe. Accordingly, a better response temperature sensor can be provided.

Preferably, in any one of the aforementioned temperature sensors, an adiabatic member is provided between the rear end of the electrically insulating member and the front end of the sheath pipe.

In the temperature sensor according to the invention, the adiabatic member is provided between the rear end of the electrically insulating member and the front end of the sheath pipe. For this reason, the electrically insulating member and the sheath pipe can be thermally insulated from each other, so that heat of exhaust gas or the like can be restrained from being transmitted (radiated) from the metal tube to the base end side of the temperature sensor through the electrically insulating member and the sheath pipe. Accordingly, a better response temperature sensor can be provided.

The adiabatic member may be preferably disposed between the metal tube and each of the electrode wires of the thermal sensing element and between the metal tube and each of the metal cores of the sheath member and may be further preferably disposed between the electrode wires and between the metal cores. In this configuration, short-circuiting between the metal tube and each of the electrode wires and between the metal tube and each of the metal cores and short-circuiting between the electrode wires and between the metal cores can be prevented.

Incidentally, an example of the adiabatic member is a member made of heat-resisting fiber (ceramic fiber) containing silica and alumina as constituent materials. Especially, a set of fibers (bulk fiber) having density of 60 to 400 kg/m$^3$ and having electrically insulating characteristic and flexibility at 1000° C. is preferred.

Preferably, in any one of the aforementioned temperature sensors, all regions of the pair of electrode wires located on the rear end side viewed from the rear end of the thermal sensing portion are disposed in the large-diameter portion.

If short-circuiting occurs because the metal tube comes into contact with one of the electrode wires of the thermal sensing element or the electrode wires come into contact with each other, the temperature cannot be detected. Therefore, it is necessary to hold the electrode wires of the thermal sensing element in the inside of the metal tube so that the metal tube can be prevented from coming into contact with one of the electrode wires or the electrodes can be prevented from coming into contact with each other. On the other hand, to improve response characteristic of the temperature sensor, it is necessary to store the thermal sensing portion in the small-diameter portion of the metal tube. Therefore, the temperature sensor according to the invention is designed so that all regions of the pair of electrode wires of the thermal sensing element located on the rear end side viewed from the rear end of the thermal sensing portion are disposed in the large-diameter portion of the metal tube. Because all regions of the pair of electrode wires of the thermal sensing element located on the rear end side viewed from the rear end of the thermal sensing portion are disposed in the large-diameter portion of the metal tube as described above, the distance between the metal tube and each of the electrode wires can be secured. Accordingly, the distance between the electrode wires, the distance between the metal tube and each of the metal cores and the distance between the metal cores can be secured. For this reason, there can be provided a temperature sensor in which the thermal sensing portion is stored in the small-diameter portion of the metal tube so that electric insulation between the metal tube and each of the electrode wires and between the metal tube and each of the metal cores and electric insulation between the electrode wires and between the metal cores are secured while response characteristic of the temperature sensor is secured.

Figure 1:
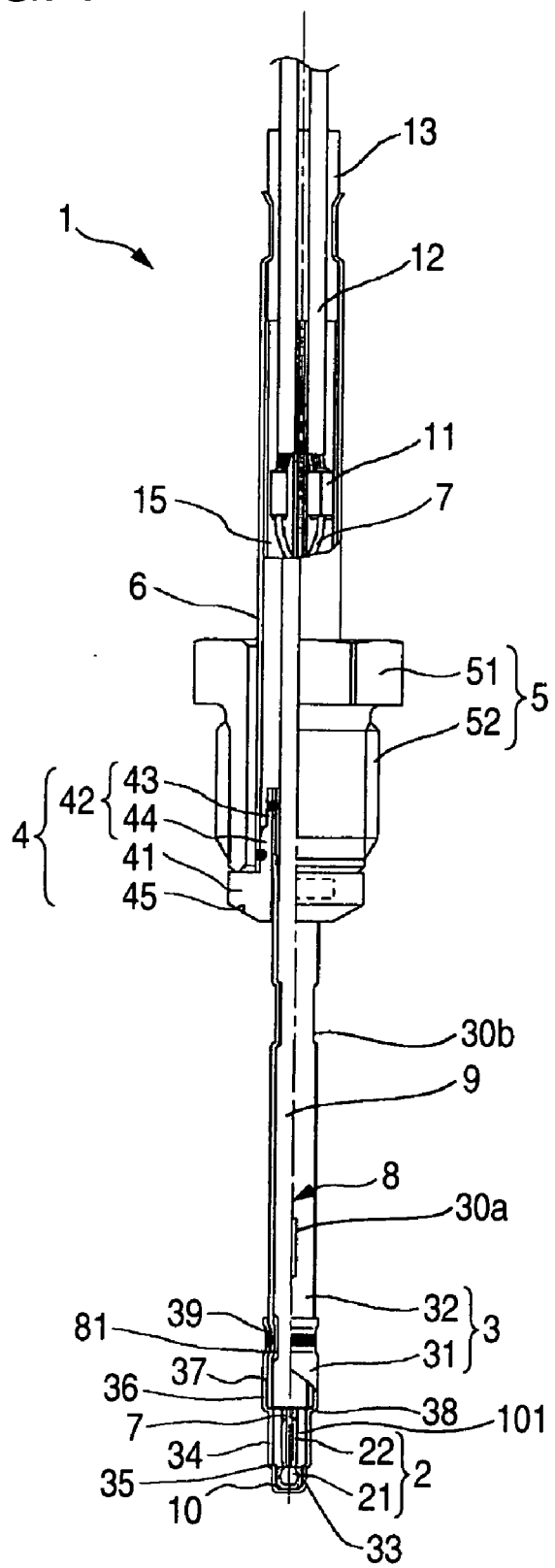
FIG. 1 is a partly cutaway sectional view showing the overall structure of a temperature sensor 1 according to a first embodiment.

Incidentally, the reference numerals in the drawings are as follows:
1, 100 . . . temperature sensor
2 . . . thermistor element
21 . . . thermistor sintered body
22 . . . electrode wire
3 . . . metal tube
30a . . . front end side crimping portion
30b . . . rear end side crimping portion
31 . . . first cylindrical portion
32 . . . second cylindrical portion
33 . . . small-diameter portion
34 . . . middle-diameter portion
35 . . . step portion
36 . . . rear end portion
38 . . . step portion
37 . . . overlap portion
39 . . . crimping portion
4 . . . flange
6 . . . joint
7 . . . metal core
8 . . . sheath member
9 . . . sheath pipe
10 . . . cement
12 . . . lead cable
101 . . . void (air layer)
102 . . . adiabatic member

BEST MODE FOR CARRYING OUT THE INVENTION (Embodiment 1)

Figure 2:
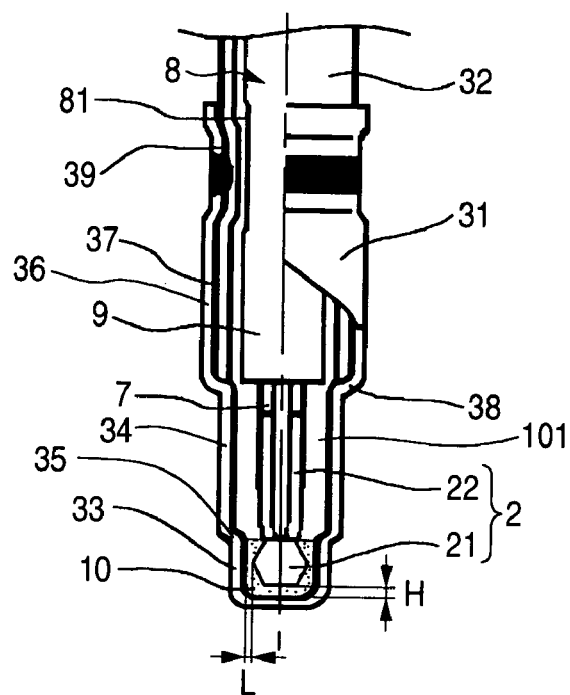
FIG. 2 is an enlarged view of the neighborhood of a thermistor element 2 which is an important part of the temperature sensor depicted in FIG. 1.

A temperature sensor 1 which is a first embodiment of the present invention will be described with reference to the drawings. FIG. 1 is a partly cutaway sectional view showing the structure of the temperature sensor 1 according to this embodiment. FIG. 2 is an enlarged view of the neighborhood of a thermistor element 2 which is an important part of the temperature sensor 1 depicted in FIG. 1. The temperature sensor 1 uses the thermistor element 2 as a thermal sensing element. In the condition that the temperature sensor 1 is mounted in an exhaust pipe of a car so that the thermistor element 2 is disposed in the exhaust pipe in which exhaust gas flows, the temperature sensor 1 is used for detecting the temperature of the exhaust gas.

A metal tube 3 is shaped like a bottomed pipe having a front end side (lower side in FIG. 1) blocked. The thermistor element 2 is held in the inside of the front end side of the metal tube 3. The metal tube 3 has a first cylindrical portion 31, and a second cylindrical portion 32. The first cylindrical portion 31 is shaped like a bottomed pipe having a front end side blocked, and a rear end side opened. The second cylindrical portion 32 is shaped like a pipe having both ends opened. The first and second cylindrical portions 31 and 32 are disposed so as to be adjacent to each other along an axial direction. More specifically, the first cylindrical portion 31 is disposed so as to surround the outer circumferential surface of the front end portion of the second cylindrical portion 32. The first cylindrical portion 31 is crimped and fixed by a crimping portion 39 formed circumferentially and is all-round-laser-welded to the crimping portion 39 to thereby be integrated with the second cylindrical portion 32. Incidentally, the first and second cylindrical portions 31 and 32 have thicknesses substantially equal to each other and are made of a stainless steel alloy as will be described later.

A thermistor sintered body 21 which is a thermal sensing portion of the thermistor element 2 is held in the inside of the first cylindrical portion 31. Incidentally, when viewed from the rear end side, a middle-diameter portion 34 and a small-diameter portion 33 are formed successively on the front end side of the first cylindrical portion 31 which is in front of a region (rear end portion 36) where an overlap portion 37 is generated between the first cylindrical portion 31 and the outer side surface of the front end portion of the second cylindrical portion 32. The middle-diameter portion 34 is formed to have an inner diameter smaller than the outer diameter of the second cylindrical portion 32. The small-diameter portion 33 is formed to have an inner diameter smaller than the outer diameter of a sheath pipe 9 which will be described later, and have an outer diameter smaller than the outer diameter of the middle-diameter portion 34. The rear end portion 36 and the middle-diameter portion 34 of the first cylindrical portion 31 and the second cylindrical portion 32 are equivalent to a large-diameter portion in the scope of claim. Step portions 35 and 38 for connecting the small-diameter portion 33 and the middle-diameter portion 34 to each other and connecting the middle-diameter portion 34 and the rear end portion 36 to each other, respectively, are formed in the first cylindrical portion 31. A front end of the second cylindrical portion 32 is made to abut on an inner surface of the step portion 38 (which is one of the step portions 35 and 38) to thereby axially align the second cylindrical portion 32 with the first cylindrical portion 31.

All the thermistor sintered body 21 which is a thermal sensing portion is held in the inside of the small-diameter portion 33 of the first cylindrical portion 31. The whole of the inside of the small-diameter portion 33 is filled with cement 10 which is an electrically insulating member. More specifically, the whole of the inside of the small-diameter portion 33 is filled with cement 10 so that the cement 10 is interposed on a side in front of the rear end surface of the thermistor sintered body 21 and between the outer surface of the thermistor sintered body 21 and the inner wall surface of the first cylindrical portion 31 (specifically, the small-diameter portion 33). Accordingly, the cement 10 is filled in between the front end of the thermistor sintered body 21 and the front end of the inner wall of the small-diameter portion 33. In this embodiment, the cement 10 is filled so that the rear end surface of the cement 10 is substantially on the same level with the rear end surface of the thermistor sintered body 21. For this reason, a void (air layer) 101 is present between the rear end surface of the cement 10 and the front end surface of the sheath pipe 9 which will be described later.

The temperature sensor 1 according to this embodiment is configured so that the longest distance H between the front end of the thermistor sintered body 21 and the front end of the inner wall of the small-diameter portion 33 is selected to be not larger than 2.0 mm (in this embodiment, the distance H is 0.3 mm). The temperature sensor 1 is also configured so that the shortest distance L between the thermistor sintered body 21 and the inner wall surface of the small-diameter portion 33 is selected to satisfy $0 \leqq L \leqq 0.3$ mm, and that the outer diameter of the small-diameter portion 33 is selected to be not larger than 3.5 mm (in this embodiment, the shortest distance L is 0.01 mm and the outer diameter of the small-diameter portion is 2.3 mm).

The cement 10 used in this embodiment is constituted by a material containing alumina as a main component. More specifically, the material is a mixture of a filler containing alumina powder as a main component and a glass component containing Si. The temperature sensor 1 according to this embodiment is configured so that the average filling rate of the cement 10 is selected to be not lower than 75% (in this embodiment, the filling rate is 85%). The "average filling rate of the cement" means the average filling rate of the cement in a region filled with the cement. Configuration is further made so that the thermal conductivity of the cement 10 is selected to be not lower than 1.2 W/m·K (in this embodiment, the thermal conductivity is 1.8 W/m·K).

On the other hand, as shown in FIG. 1, the second cylindrical portion 32 is fixed to the flange 4 made of a stainless steel alloy in a state in which the rear end side of the second cylindrical portion 32 is inserted into the inside of the flange 4. The second cylindrical portion 32 is provided so that the front end side of a sheath member 8 which will be described later is disposed in the inside of the second cylindrical portion 32. Incidentally, a front end side crimping portion 30a and a rear end side crimping portion 30b are provided in axially separate positions (regions) of the second cylindrical portion 32. The front end side crimping portion 30a and the rear end side crimping portion 30b are formed by crimping themselves toward the sheath member 8 (specifically, toward the outer circumferential surface of the sheath pipe 9 of the sheath member 8 which will be described later) from the outside. The second cylindrical portion 32 and the sheath member 8 are fixed (crimped and fixed) to each other by the front end side crimping portion 30a and the rear end side crimping portion 30b. Although the sheath member 8 is fixed to the second cylindrical portion 32 by the two crimping portions 30a and 30b, a void for forming an air passage to lead air from the rear end side toward the front end side of the metal tube 3 is formed between the inner circumferential surface of the second cylindrical portion 32 except the two crimping portions 30a and 30b and the outer circumferential surface of the sheath pipe 9 of the sheath member 8.

The flange 4 has a sleeve portion 42 extending axially, and a protrusive portion 41 located on the front end side of the sleeve portion 42 and protruding radially outwards. The protrusive portion 41 is shaped like a ring having a bearing surface 45 on its front end side. The bearing surface 45 has a taper shape corresponding to a taper portion of an exhaust pipe mount portion not shown. The bearing surface 45 is perfectly fitted to the taper portion of the mount portion to thereby prevent exhaust gas from being leaked out of the exhaust pipe. The sleeve portion 42 is shaped like a ring and forms a double-step shape having a front end side step portion 44 located on the front end side, and a rear end side step portion 43 having an outer diameter smaller than that of the front end side step portion 44.

The second cylindrical portion 32 is inserted into the rear end side of the flange 4 from the front end side of the second cylindrical portion 32 and press-fitted into the inside of the sleeve portion 42. A portion in which the outer circumferential surface of the second cylindrical portion 32 and the inner circumferential surface of the rear end side step portion 43 of the sleeve portion 42 overlap each other is laser-welded circumferentially.

A nut 5 having a hexagonal nut portion 51 and a threaded portion 52 is rotatably fitted around the flange 4. The temperature sensor 1 is fixed by the nut 5 while the bearing surface 45 of the protrusive portion 41 of the flange 4 is made to abut on the exhaust pipe mount portion. A cylindrical joint 6 is airtightly connected to the radial outside of the front end side step portion 44 of the sleeve portion 42 in the flange 4. Specifically, in the condition that the joint 6 is press-fitted into the front end side step portion 44 of the sleeve portion 42 so that the inner circumferential surface of the joint 6 overlaps the outer circumferential surface of the front end side step portion 44 of the sleeve portion 42, the joint 6 and the front end side step portion 44 are laser-welded to each other circumferentially.

The sheath member 8 for holding a pair of metal cores 7 in the sheath pipe 9 while electrically insulating the pair of metal cores 7 is disposed inside the second cylindrical portion 32 of the metal tube 3, the flange 4 and the joint 6. The sheath member 8 is crimped and fixed to the second cylindrical portion 32 by the front end side crimping portion 30a and the rear end side crimping portion 30b as described above. The metal cores 7 protruding from the front end side of the sheath member 8 are connected to a pair of Pt/Rh alloy electrode wires 22 respectively by resistance welding. The pair of electrode wires 22 form the thermistor element 2. Incidentally, a front end portion of the pair of electrode wires 22 are buried in the thermistor sintered body 21 having its front end portion shaped like a hexagon in axial sectional view. The pair of electrode wires 22 are formed by sintering simultaneously with the thermistor sintered body 21. Regions of the electrode wires 22 located on the rear end side of the rear end surface of the thermistor sintered body 21 are disposed in the middle-diameter portion 34. The sheath member 8 includes the sheath pipe 9 of SUS310S, the pair of electrically conductive metal cores 7 of SUS310S, and electrically insulating powder filled in between the sheath pipe 9 and each of the metal cores 7. The metal cores 7 are held in the sheath pipe 9 while electrically insulated.

The metal cores 7 protruding to the rear end side of the sheath member 8 in the inside of the joint 6 are connected to a pair of external circuit (e.g. ECU of a vehicle) connection lead cables 12 by crimping terminals 11 respectively. Each of the lead cables 12 has a stainless steel wire disposed in the center, a nickel-plated copper wire for surrounding the stainless steel wire, and an electrically insulating coating member of an ethylene tetrafluoride resin with which the stainless steel wire and the nickel-plated copper wire are coated. The pair of metal cores 7 and the pair of crimping terminals 11 are electrically insulated from each other by an electrically insulating tube 15. The lead cables 12 are inserted into an auxiliary ring 13 of heat-resisting rubber provided in a rear end side opening of the joint 6. When the auxiliary ring 13 is circularly or polygonally crimped on the joint 6, the two 13 and 6 are fixed to each other while airtightness is kept. An electric output from the thermistor sintered body 21 in accordance with the temperature change of the exhaust gas is taken out to an external circuit (not shown) through the electrode wires 22, the metal cores 7 of the sheath member 8 and the lead cables 12. The electric output is used for detecting the temperature of the exhaust gas.

Incidentally, because the temperature sensor 1 for detecting the temperature of the exhaust gas is used under a high-temperature environment in which the temperature reaches 1000° C., the respective constituent members of the temperature sensor 1 need to have sufficient heat resistance. Therefore, each of the first and second cylindrical portions 31 and 32 constituting the metal tube 3, the flange 4 and the metal cores 7 is made of SUS310S which is a heat-resisting alloy containing Fe as a main component and containing C, Si, Mn, P, S, Ni and Cr. The joint 6 is made of SUS304.

The temperature sensor 1 is produced as follows. First, a deep drawing process is applied to a steel plate of SUS310S to thereby form a second cylindrical portion 32 having a thickness of 0.3 mm, an inner diameter of 2.7 mm, an outer diameter of 3.3 mm and a total length (axial dimension) of 54 mm and having both ends opened, and a first cylindrical portion 31 shaped like a bottomed pipe having a thickness of 0.3 mm and a total length (axial dimension) of 13 mm. Incidentally, the first cylindrical portion 31 is processed so that a small-diameter portion 33 having an inner diameter of 1.7 mm and an outer diameter of 2.3 mm, a middle-diameter portion 34 having an inner diameter 2.4 mm and an outer diameter of 3.0 mm, a rear end portion 36 having an inner diameter of 3.4 mm and an outer diameter of 4.0 mm, and step portions 35 and 38 having taper shapes and provided for connecting the small-diameter portion 33 and the middle-diameter portion 34 to each other and connecting the middle-diameter portion 34 and the rear end portion 36 to each other, respectively, are formed. On the other hand, a cold forging or/and cutting process is separately applied to a metal body of SUS310S to thereby form a flange 4 which has a bore for press-fitting and fixing the second cylindrical portion 32 thereinto, a sleeve portion 42 having a double-step shape with a front end side step portion 44 and a rear end side step portion 43, and a protrusive portion 41 located on the front end side of the sleeve portion 42 and protruding radially outwards.

Then, in a first process, the electrode wires 22 of the thermistor element 2 and the metal cores 7 of the sheath member 8 are stacked so as to overlap each other by a predetermined size and are resistance-welded to each other to thereby produce a thermal sensing element assembly in which the thermistor element 2 is connected to the sheath member 8.

Incidentally, a concave portion 81 depressed radially inwards is formed in a predetermined region on the front end side of the sheath pipe 9 constituting the sheath member 8 so that a crimping portion 39 formed when the first and second cylindrical portions 31 and 32 are crimped and fixed in an after-process is prevented from coming into contact with the outer circumferential surface of the sheath pipe 9. The sheath pipe 9 is formed so that the other portion than the concave portion 81 has a thickness of 0.3 mm and an outer diameter of 2.5 mm. Then, the second cylindrical portion 32 is press-fitted and fixed into the bore of the flange 4 and the portion where the outer circumferential surface of the second cylindrical portion 32 and the inner circumferential surface of the rear end side step portion 43 of the sleeve portion 42 overlap each other is laser-welded circumferentially.

Then, in a second process, the thermal sensing element assembly is inserted into the second cylindrical portion 32 laser-welded to the flange 4. On this occasion, insertion of the thermal sensing element assembly into the rear end side opening of the second cylindrical portion 32 is started from a side of the thermal sensing element assembly on which the thermistor element 2 is disposed. Then, the thermistor sintered body 21 of the thermistor element 2 is made to protrude from the front end side of the second cylindrical portion 32 by a predetermined size. At the point of time when the thermistor sintered body 21 protrudes by the predetermined size, insertion of the thermal sensing element assembly into the second cylindrical portion 32 is terminated. Then, confirmation is made as to whether the connection portion between each electrode wire 22 protruding from the front end side of the second cylindrical portion 32 and a corresponding metal core 7 is normal or not, as to whether the electrode wires 22 are in contact with each other or not, and as to whether the metal cores 7 are in contact with each other or not. When this confirmation operation results in a decision that the thermal sensing element assembly is normal, an operation of fixing the second cylindrical portion 32 and the thermal sensing element assembly to each other is then performed.

The fixation of the second cylindrical portion 32 and the thermal sensing element assembly is performed by the following procedure. First, a region of the second cylindrical portion 32 protruding from the flange 4 toward the front end side and near to the front end of the flange 4 is crimped toward the outer circumferential surface of the sheath pipe 9 of the sheath member 8. The crimping process is performed by use of a crimping die in such a manner that the second cylindrical portion 32 is crimped at two points opposite to each other circumferentially from the outside of the second cylindrical portion 32. Thus, the rear end side crimping portion 30b crimped at two points is formed.

Then, a region separated on the axially front end side from the rear end side crimping portion 30b and on the rear end side of the concave portion 81 is crimped toward the outer circumferential surface of the sheath pipe 9 of the sheath member 8. This crimping process is also performed by use of the same crimping die as described above in such a manner that the second cylindrical portion 32 is crimped at two points opposite to each other circumferentially from the outside of the second cylindrical portion 32. Thus, the front end side crimping portion 30a crimped at two points is formed. The sheath member 8 (thermal sensing element assembly) and the second cylindrical portion 32 are crimped and fixed to each other by the front end side crimping portion 30a and the rear end side crimping portion 30b. In the condition that the thermistor sintered body 21 is made to protrude from the front end side of the second cylindrical portion 32 by a predetermined size as described above, the thermal sensing element assembly and the second cylindrical portion 32 are assembled so as to be integrated with each other.

Incidentally, in this embodiment, the front end side crimping portion 30a and the rear end side crimping portion 30b are formed so that the axial length of each of the crimping portions 30a and 30b in the axial direction is larger than the crimping width. Specifically, each of the two crimping portions 30a and 30b is formed to have an axial length of 4.0 mm and a crimping width of 0.4 mm.

Then, a third process is performed for storing the thermistor element 2 in the inside of the bottomed pipe-shaped metal tube 3 by combining the first cylindrical portion 31 with the second cylindrical portion 32 combined with the thermal sensing element assembly. First, electrically insulating paste which will serve as cement 10 is applied so that the circumference (except the rear end surface of the thermistor sintered body 21) of the thermistor sintered body 21 protruding from the front end side of the second cylindrical portion 32 by a predetermined size is covered with the electrically insulating paste. Then, the first cylindrical portion 31 is loosely and coaxially fitted onto the front end side of the second cylindrical portion 32 and the first cylindrical portion 31 is disposed so as to be adjacent to the second cylindrical portion 32 so that the rear end portion 36 of the first cylindrical portion 31 surrounds the outer surface of the front end portion of the second cylindrical portion 32. On this occasion, the first cylindrical portion 31 is disposed relative to the second cylindrical portion 32 so that the overlap portion 37 of a predetermined size is loosely formed at the front end portion of the second cylindrical portion 32, and that the thermistor sintered body 21 of the thermistor element 2 is stored together with the electrically insulating paste in the small-diameter portion 33 of the first cylindrical portion 31.

In this embodiment, the first cylindrical portion 31 is inserted onto the second cylindrical portion 32 until the front end of the second cylindrical portion 32 abuts on the inner surface of the step portion 38 connected to the rear end side of the middle-diameter portion 34 of the first cylindrical portion 31 to thereby align the first cylindrical portion 31 with the second cylindrical portion 32 axially. That is, in this embodiment, the first cylindrical portion 31 is loosely and coaxially fitted onto the second cylindrical portion 32. The respective dimensions of the first cylindrical portion 31 are adjusted in advance so that the overlap portion 37 of a predetermined size is formed at the point of time when the front end of the second cylindrical portion 32 abuts on the inner surface of the step portion 38 of the first cylindrical portion 31. Accordingly, in this embodiment, because the respective dimensions of the first cylindrical portion 31 are adjusted suitably so that insertion can be performed in such a manner that the front end of the second cylindrical portion 32 abuts on the inner surface of the step portion 38 of the first cylindrical portion 31, the axial overlap size of the first cylindrical portion 31 with the second cylindrical portion 32 can be decided uniquely. As a result, the thermistor sintered body 21 can be disposed surely in a target position of the first cylindrical portion 31.

Then, in a portion which is an overlap portion 37 between the rear end portion 36 of the first cylindrical portion 31 and the front end portion of the second cylindrical portion 32 and which surrounds the concave portion 81 formed in the sheath pipe 9 of the sheath member 8, the first cylindrical portion 31 located on the outside is crimped circumferentially toward the second cylindrical portion 32 located on the inside to thereby form a crimping portion 39. Incidentally, this crimping is performed by eight-direction round crimping. The crimping portion 39 formed thus is equivalent to a laser-welded portion-forming region formed by all-round laser welding as will be described later. Because the crimping portion 39 is formed, the value of avoid between the first cylindrical portion 31 and the second cylindrical portion 32 can be reduced so that all-round laser welding excellent in welding strength can be performed.

Then, the crimping portion 39 formed in the overlap portion 37 is all-round welded by laser beam LB irradiation to form a laser-welded portion which connects the first and second cylindrical portions 31 and 32 to thereby integrate the two cylindrical portions 31 and 32 with each other. Then, an assembly obtained by integrating the two cylindrical portions 31 and 32 with each other is heated to solidify the electrically insulating paste to thereby obtain the cement 10.

Then, the crimping terminals 11 are used so that the rear end portions of the metal cores 7 of the sheath member 8 are electrically connected to the lead cables 12 by a commonly known method. Then, the cylindrical joint 6 is press-fitted onto the axial outside of the front end side step portion 44 of the sleeve portion 42, and the joint 6 and the front end side step portion 44 are circumferentially laser-welded to each other. Thus, the joint 6 is fixed to the flange 4 airtightly. Then, the auxiliary ring 13, the nut 5, etc. are attached suitably. Thus, the production of the temperature sensor 1 is completed.

In the temperature sensor 1 according to this embodiment, the whole inside of the small-diameter portion 33 is filled with the cement 10 so that the cement 10 is interposed between the outer surface of the thermistor sintered body 21 and the inner wall surface of the first cylindrical portion 31 (specifically, the small-diameter portion 33) of the metal tube 3 on the front end side viewed from the rear end surface of the thermistor sintered body 21. Because the cement 10 is filled as described above, heat transmitted to the metal tube 3 (the first cylindrical portion 31) can be transmitted to the thermistor element 2 through the cement 10 efficiently. Particularly, in the temperature sensor 1 according to this embodiment, the cement 10 is filled in between the front end of the thermistor sintered body 21 and the front end of the inner wall of the small-diameter portion 33 so that the front end of the thermistor sintered body 21 and the front end of the inner wall of the small-diameter portion 33 touch each other through the cement 10. Accordingly, heat transmitted to the front end of the metal tube 3 can be transmitted to the thermistor element 2 efficiently. For this reason, in the temperature sensor 1 according to this embodiment, increase in response speed for detecting the temperature can be attained. Moreover, the cement 10 can prevent the thermistor element 2 from moving due to vibration or the like. Moreover, because the thermistor sintered body 21 is stored in the inside of the small-diameter portion 33 of the metal tube 3, the heat capacity of this portion becomes so low that response characteristic can be improved. Moreover, the distance between the thermistor sintered body 21 and the inner wall surface of the metal tube (specifically, the inner wall surface of the small-diameter portion 33) can be shortened so that response characteristic can be improved more greatly.

Moreover, in the temperature sensor 1 according to the invention, the void 101 is present between the rear end surface of the cement 10 and the front end surface of the sheath pipe 9. Accordingly, heat transmitted to the metal tube 3 can be restrained from being transmitted (radiated) from the metal tube 3 to the rear end side of the temperature sensor 1 through the cement 10 and the sheath pipe 9. Moreover, the regions of the electrode wires 22 of the thermistor element 2 located on the rear end side viewed from the rear end surface of the thermistor sintered body 21 are disposed in the middle-diameter portion 34 having a diameter larger than that of the small-diameter portion 33 of the first cylindrical portion 32 in which the thermistor sintered body 21 is disposed. For this reason, the distance between the first cylindrical portion 32 and each of the electrode wires 22 can be secured. Accordingly, the distance between the electrode wires 22, the distance between the first cylindrical portion 32 and each of the metal cores 7 and the distance between the metal cores 7 can be secured. Accordingly, electrical insulation between the first cylindrical portion 32 and each of the electrode wires 22 and between the first cylindrical portion 32 and each of the metal cores 7 and electrical insulation between the electrode wires 22 or between the metal cores 7 can be secured.

Moreover, the temperature sensor 1 according to this embodiment is configured so that the longest distance H between the front end of the thermistor sintered body 21 and the front end of the inner wall of the small-diameter portion 33 is selected to be not larger than 2.0 mm. When the longest distance H is set as described above, a better response temperature sensor can be provided. Moreover, the temperature sensor 1 according to this embodiment is configured so that the shortest distance L between the thermistor sintered body 21 and the inner wall surface of the small-diameter portion 33 is selected to be in a range $0 \leq L \leq 0.3$ mm, and that the outer diameter of the small-diameter portion 33 is selected to be not larger than 3.5 mm. When the shortest distance L and the outer diameter of the small-diameter portion 33 are set as described above, a better response temperature sensor can be provided.

Moreover, the temperature sensor 1 according to this embodiment is configured so that the average filling rate of the cement 10 is selected to be not lower than 75%. For this reason, the structure of the cement 10 becomes so dense that the heat conducting characteristic of the cement 10 can be improved. Heat transmitted to the metal tube 3 can be transmitted from the metal tube 3 to the thermistor sintered body 21 rapidly. Accordingly, a better response temperature sensor can be provided. Incidentally, for example, the average filling rate of the cement 10 can be calculated as follows. First, a region of the temperature sensor in which the cement 10 is filled is cut and the section obtained is polished so that a sectional image of the cement 10 can be obtained. Then, a 100-power enlarged image of the polished section is acquired from a scanning electron microscope (JSM-5410 made by JEOL). Specific virtual lines (e.g. virtual lines of 300 μm square) are drawn on the enlarged image obtained. The ratio of the area of the cement present in the virtual lines to the area surrounded by the virtual lines is measured. The area ratios are measured at a plurality of different places on the enlarged image. The average of the area ratios obtained is calculated as the average filling rate.

Moreover, the temperature sensor 1 according to this embodiment is configured so that the heat conductivity of the cement 10 is selected to be not lower than 1.2 W/m·K. When the cement 10 is set as described above, a better response temperature sensor can be provided. Incidentally, for example, the heat conductivity of the cement 10 can be obtained in such a manner that the cement taken out of the temperature sensor is measured by a thermal constant measuring apparatus (TC-7000 made by ULVAC-RIKO, Inc.).

Moreover, in the temperature sensor 1 according to this embodiment, a material containing alumina as a main component is used as the material of the cement 10. For this reason, a temperature sensor excellent in durability and response characteristic can be provided. Incidentally, for example, the material component of the cement 10 can be confirmed by an X-ray diffraction apparatus (ROTAFLEX RU-200 made by Rigaku Corp.).

(Embodiment 2)

Next, a temperature sensor according to a second embodiment of the invention will be described with reference to FIG. 3. In the temperature sensor 1 according to Embodiment 1, the void 101 is formed between the rear end surface of the cement 10 and the front end surface of the sheath pipe 9. On the contrary, the temperature sensor 100 according to Embodiment 2 is different from the temperature sensor 1 according to Embodiment 1 in that an adiabatic member is provided between the rear end surface of the cement and the front end surface of the sheath pipe. Embodiment 2 is the same as Embodiment 1 in the other points. Accordingly, only the different point will be described and the description of the same points will be omitted.

Figure 3:
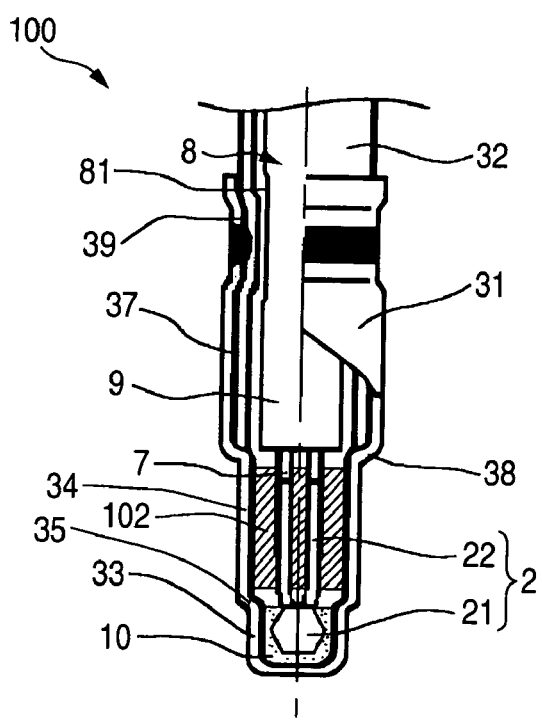
FIG. 3 is an enlarged view of the neighborhood of a thermistor element 2 which is an important part of a temperature sensor 100 according to a second embodiment.

FIG. 3 is an enlarged view of the neighborhood of a thermistor element 2 which is an important part of the temperature sensor 100. In the temperature sensor 100, an adiabatic member 102 made of alumina ceramic fiber is provided between the cement 10 and the sheath pipe 9. The adiabatic member 102 is disposed so as to be interposed between the metal tube 3 and each of the electrode wires 22 and the metal cores 7, between the electrode wires 22 and between the metal cores 7.

The method of producing the temperature sensor 100 is obtained by adding only the process of attaching the adiabatic member 102 to the method of producing the temperature sensor 1 according to Embodiment 1. The adiabatic member 102 is attached as follows. Electrically insulating paste which will serve as the cement 10 is applied on the circumference of the thermistor sintered body 21. Then, the adiabatic member 102 is attached to the electrode wires 22 and the metal cores 7 so that the surfaces of the electrode wires 22 and the metal cores 7 are covered with the adiabatic member 102. The other is produced by the same production method as the temperature sensor 1 according to Embodiment 1.

In the temperature sensor 100 according to this embodiment, the adiabatic member 102 is disposed so as to be interposed between the metal tube 3 and each of the electrode wires 22 and the metal cores 7, between the electrodes 22 and between the metal cores 7. For this reason, heat can be retained from being transmitted (radiated) from the metal tube 3 to the rear end side of the temperature sensor 1 through the cement 10 and the sheath pipe 9. Moreover, short-circuiting between the metal tube 3 and each of the electrode wires 22 and the metal cores 7, short-circuiting between the electrode wires 22 and short-circuiting between the metal cores 7 can be prevented surely. Accordingly, a good response temperature sensor can be provided while electrical insulation can be kept surely.

A test for confirming the effect of the temperature sensors according to Embodiments 1 and 2 was performed as follows.

TEST EXAMPLE 1

First, the relation between response time and the distance H between the front end of the thermistor sintered body 21 and the front end of the inner wall of the small-diameter portion 33 of the metal tube 3 (first cylindrical portion 32) was examined. For the examination, several kinds of temperature sensors having the same configuration as in Embodiment 1 but different in the distance H between the front end of the thermistor sintered body 21 and the front end of the inner wall of the small-diameter portion 33 of the metal tube were produced. Each of the temperature sensors was put so that the thermistor sintered body 21 was located in an exhaust pipe containing 20 m/s of exhaust gas at 600° C. The time (response time) until a signal output from the temperature sensor reached 63% of 600° C. (i.e. 378° C.) was measured. In the case of a conventional temperature sensor, the response time was longer than 7 sec.

Figure 4:
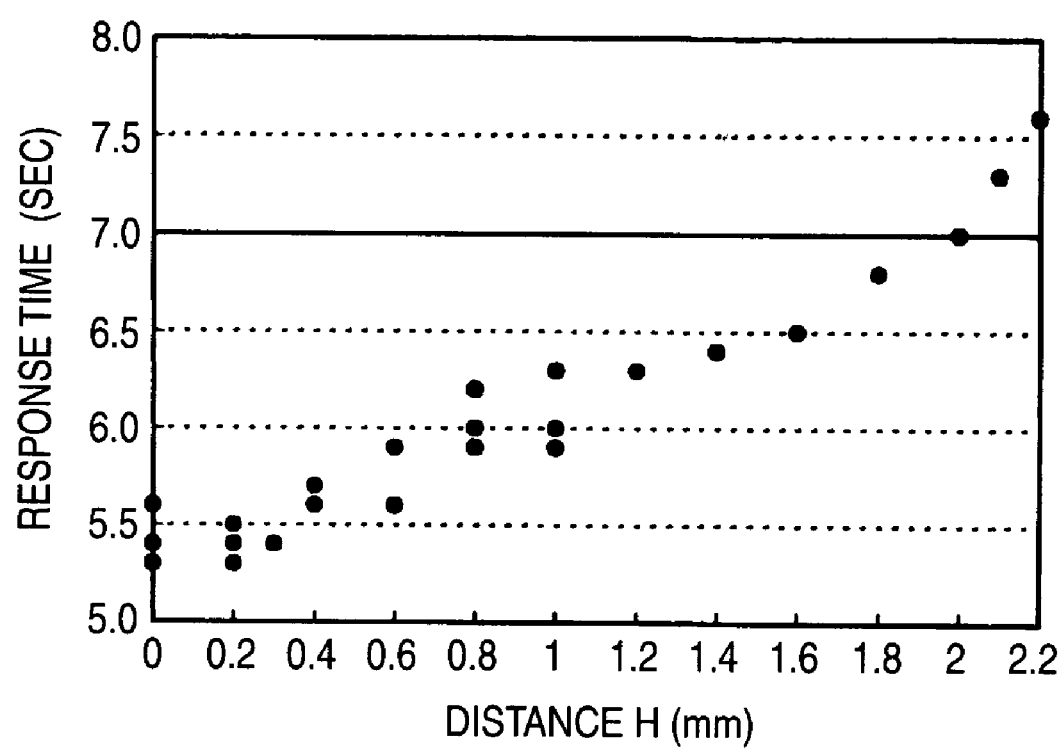
FIG. 4 is a graph showing results of examination into the relation between distance H and response time in Test Example 1.

FIG. 4 is a graph showing results of the examination into the relation between the distance H and response time. As the distance H became shorter, the response time became rapider. When the distance H was not longer than 2.0 mm, the response time was not longer than 7 sec. From this result, a temperature sensor which can achieve high response characteristic can be obtained when the distance H is selected to be not longer than 2.0 mm.

TEST EXAMPLE 2

Next, the relation among the shortest distance L between the thermistor sintered body 2 and the inner wall surface of the small-diameter portion 33 of the metal tube 3, the outer diameter of the small-diameter portion 33 and response time was examined. Five kinds of temperature sensors (sample Nos. 1 to 5) having the same configuration as in Embodiment 1 but different in the shortest distance L between the thermistor sintered body 21 and the inner wall surface of the small-diameter portion 33 of the metal tube 3 and the outer diameter of the small-diameter portion 33 were produced. Each of the temperature sensors was tested in the same manner as in Test Example 1, so that response time was measured. Results thereof are shown in Table 1.

TABLE 1

| Sample No. | Shortest Distance L (mm) | Outer Diameter of Small-Diameter Portion (mm) | Response Time (sec) |
| --- | --- | --- | --- |
| 1 | 0.01 | 2.3 | 5.4 |
| 2 | 0.21 | 2.7 | 5.9 |
| 3 | 0.3 | 3.5 | 6.5 |
| 4 | 0.51 | 3.3 | 8.7 |
| 5 | 0.21 | 3.7 | 10.8 |

As the shortest distance L and the outer diameter of the small-diameter portion 33 became shorter, the response time became rapider. When the shortest distance L was in a range $0 \leq L \leq 0.3$ mm and the outer diameter of the small-diameter portion 33 was not longer than 3.5 mm (sample Nos. 1 to 3), the response time was not longer than 6.5 sec. Particularly when the outer diameter of the small-diameter portion 33 was not longer than 3.0 mm (sample Nos. 1 and 2), the response time was not longer than 6 sec. From this result, a temperature sensor which can achieve higher response characteristic can be obtained when the shortest distance L is selected to be in a range $0 \leq L \leq 0.3$ mm and the outer diameter of the small-diameter portion is selected to be not longer than 3.5 mm.

TEST EXAMPLE 3

Next, the effect obtained when a void (air layer) 101 or an adiabatic member 102 made of ceramic fiber was provided between the thermistor sintered body 21 and the sheath pipe 9 was examined. Three kinds of temperature sensors were produced. That is, a temperature sensor according to Embodiment 1 (temperature sensor sample No. 6 provided with the void (air layer) 101), a temperature sensor according to Embodiment 2 (temperature sensor sample No. 7 provided with the adiabatic member 102 made of ceramic fiber) and a temperature sensor (sample No. 8) having the same configuration as in Embodiment 1 but the thermistor sintered body 21 and the sheath pipe 9 touching each other through cement 10 filled in between the thermistor sintered body 21 and the sheath pipe 9 were produced. Each of the temperature sensors was tested in the same manner as in Test Example 1, so that response time was measured. As a result, in the temperature sensor sample No. 8 in which the thermistor sintered body 21 and the sheath pipe 9 were connected to each other through the cement 10, the response time was 6.2 sec. On the contrary, in each of the temperature sensors (Nos. 6 and 7) according to Embodiments 1 and 2, the response time was 5.4 sec, that is, the response time was shortened. From this result, a temperature sensor which can achieve high response characteristic can be obtained when the void (air layer) 101 or the adiabatic member 102 is provided between the thermistor sintered body 21 and the sheath pipe 9.

Although the invention has been described above in conformity with embodiments thereof, the invention is not limited to the specific embodiments and it is a matter of course that various changes may be made without departing from the gist of the invention. For example, the shape of the thermistor sintered body 21 serving as a thermal sensing portion is not limited to a hexagonal shape in axial sectional view and may be a circular shape or an elliptical shape. The temperature sensor 1 or 100 can be applied not only to an exhaust gas temperature sensor but also to a temperature sensor mounted in a flow path in which liquid such as water or oil flows as a measurement fluid. It can be further applied to a temperature sensor having a structure in which a metal cap shaped like a bottomed pipe for holding the thermistor element is welded to the front end side outer surface of the sheath member as disclosed in Patent Document 1. The metal tube may be provided as one member.

This application is based on Japanese Patent Application (Patent Application No. 2003-089560) filed on Mar. 28, 2003 and Japanese Patent Application (Patent Application No. 2004-079630) filed on Mar. 19, 2004 and the contents thereof are taken in by reference.

INDUSTRIAL APPLICABILITY

The invention relates to a temperature sensor in which a thermal sensing element having a thermal sensing portion such as a thermistor sintered body of semiconductor such as metal oxide, etc. or a metal resistor is held in the inside of a metal tube shaped like a bottomed pipe. According to the invention, there can be provided a temperature sensor which can achieve high response characteristic.

The invention claimed is:

1. A temperature sensor comprising:
   a cylindrical metal tube extending in an axial direction and having a front end portion including a sidewall and a closed bottom;
   a thermal sensing element held in an inside of said metal tube and including a thermal sensing portion with electrical characteristic varying according to a temperature, and a pair of electrode wires provided in said thermal sensing portion and extending toward a rear end portion of said metal tube; and
   a sheath member held in an inside of said metal tube and including a sheath pipe in which a pair of metal cores connected to said pair of electrode wires of said thermal sensing element are held while electrically insulated, wherein:
   said metal tube has a small-diameter portion located on said front end portion and entirely having an inner diameter smaller than an outer diameter of said sheath member, and a large-diameter portion located on a rear end portion of said small-diameter portion and having a diameter larger than an outer diameter of said small-diameter portion; and
   said thermal sensing portion is held in said small-diameter portion and an electrically insulating member is filled at least in between a front end of said thermal sensing portion and an inner wall of the closed bottom of said metal tube.

2. The temperature sensor as claimed in claim 1, wherein a longest distance H between said front end of said thermal sensing portion and an inner wall of the closed bottom of said metal tube is not larger than 2.0 mm.

3. The temperature sensor as claimed in claim 1, wherein:
   a shortest distance L between said thermal sensing portion and said metal tube satisfies $0 \leq L \leq 0.3$ mm; and an outer diameter of said small-diameter portion is not larger than 3.5 mm.

4. The temperature sensor as claimed in claim 1, wherein an average filling rate of said electrically insulating member is not lower than 75%.

5. The temperature sensor as claimed in claim 1, wherein a heat conductivity of said electrically insulating member is not lower than 1.2 W/m·K.

6. The temperature sensor as claimed in claim 1, wherein said electrically insulating member is a material containing alumina as a main component.

7. The temperature sensor as claimed in claim 1, wherein said electrically insulating member is filled at least in a whole of a space ranging from an inner wall of the closed bottom of said metal tube to a rear end of said thermal sensing portion.

8. The temperature sensor as claimed in claim 1, wherein said electrically insulating member is filled at least in a whole of said small-diameter portion.

9. The temperature sensor as claimed in claim 1, wherein a rear end of said electrically insulating member is located on a front end portion viewed from a front end of said sheath pipe.

10. The temperature sensor as claimed in claim 7, wherein an adiabatic member is provided between a rear end of said electrically insulating member and a front end of said sheath pipe.

11. The temperature sensor as claimed in claim 1, wherein all regions of said pair of electrode wires located on a rear end portion viewed from a rear end of said thermal sensing portion are disposed in said large-diameter portion.

12. The temperature sensor as claimed in claim 1, wherein said front end of the thermal sensing portion is in contact with the inner wall of said closed bottom of the metal tube through the electrically insulating member.

* * * * *